(12) United States Patent
Ziegler et al.

(10) Patent No.: US 12,027,284 B2
(45) Date of Patent: Jul. 2, 2024

(54) ELECTRICALLY INSULATED ELECTRIC CONDUCTOR STRIP, IN PARTICULAR FOR ELECTRIC MOTORS AND TRANSFORMERS

(71) Applicant: ALANOD GMBH & CO. KG, Ennepetal (DE)

(72) Inventors: Stefan Ziegler, Sprockhövel (DE); Volker Wandelt, Cologne (DE)

(73) Assignee: ALANOD GMBH & CO. KG, Ennepetal (DE)

( * ) Notice: Subject to any disclaimer, the term of this patent is extended or adjusted under 35 U.S.C. 154(b) by 548 days.

(21) Appl. No.: 17/219,286

(22) PCT Filed: Oct. 1, 2019

(86) PCT No.: PCT/EP2019/076587
§ 371 (c)(1),
(2) Date: Mar. 31, 2021

(87) PCT Pub. No.: WO2020/070123
PCT Pub. Date: Apr. 9, 2020

(65) Prior Publication Data
US 2021/0391096 A1     Dec. 16, 2021

(30) Foreign Application Priority Data
Oct. 2, 2018   (DE) .................. 20 2018 105 660.3

(51) Int. Cl.
*H01B 3/30*   (2006.01)
*H01F 5/06*   (2006.01)
(Continued)

(52) U.S. Cl.
CPC ............. *H01B 3/302* (2013.01); *H01F 5/06* (2013.01); *H01F 27/323* (2013.01); *H01F 41/122* (2013.01); *H02K 3/30* (2013.01)

(58) Field of Classification Search
None
See application file for complete search history.

(56) References Cited

U.S. PATENT DOCUMENTS 3,555,670 A * 1/1971 Zickar et al. ....... H01F 27/2847
174/120 SR
5,281,488 A   1/1994 Poulsen
(Continued)

FOREIGN PATENT DOCUMENTS

CN   101894620 A   11/2010
DE      1765866 A1   10/1971
(Continued)

OTHER PUBLICATIONS

International Search Report of PCT/EP2019/076587, dated Jan. 27, 2020.

*Primary Examiner* — Jeffrey D Washville
(74) *Attorney, Agent, or Firm* — DICKINSON WRIGHT PLLC

(57) ABSTRACT

An electrically insulated electric conductor strip (1), in particular for electric motors and transformers, having a strip-like electric conductor (2) which has an upper cover surface (2a) and a lower cover surface (2b), two side edge surfaces (2c) and, at each end, an end edge surface, and having electrical insulation (3), which is arranged on at least one cover surface of the strip (2a, 2b). In order to create a conductor strip (1) of this kind which can be produced with reduced effort but has a high electrical insulation effect, the insulation comprises a paint layer (3a) and an adhesive strip (3b), which is adhered to the lower cover surface (2b) and/or the upper cover surface (2a) of the strip-like electrical conductor (2), more specifically at least in a region (4) in each case which borders a side edge surface (2c), the paint layer (3a) being beneath the adhesive tape (3b) and at least (Continued)

directly on the lower cover surface (2*b*) and/or on the upper surface (2*a*).

22 Claims, 3 Drawing Sheets

(51) Int. Cl.
*H01F 27/32* (2006.01)
*H01F 41/12* (2006.01)
*H02K 3/30* (2006.01)

(56) References Cited

U.S. PATENT DOCUMENTS

| | | | |
|---|---|---|---|
| 7,243,716 B2 | 7/2007 | Denniel et al. | |
| 7,768,162 B2 | 8/2010 | Asao et al. | |
| 9,336,942 B2 | 5/2016 | Yamada et al. | |
| 9,704,615 B2 | 7/2017 | Matsuda et al. | |
| 10,957,464 B2 | 3/2021 | Walder et al. | |
| 2001/0001895 A1* | 5/2001 | Setiabudi | H02K 41/02 29/609 |
| 2005/0103489 A1 | 5/2005 | Denniel et al. | |
| 2008/0246354 A1 | 10/2008 | Asao et al. | |
| 2015/0243409 A1 | 8/2015 | Gronowski et al. | |
| 2015/0287525 A1 | 10/2015 | Yamada et al. | |
| 2016/0155540 A1 | 6/2016 | Matsuda et al. | |
| 2016/0351325 A1 | 12/2016 | Xie et al. | |
| 2020/0118707 A1 | 4/2020 | Walder et al. | |

FOREIGN PATENT DOCUMENTS

| | | |
|---|---|---|
| DE | 2215979 A1 | 10/1973 |
| DE | 102014119720 A1 | 6/2016 |
| EP | 3109873 A1 | 12/2016 |
| FR | 2474397 A1 | 7/1981 |
| GB | 900519 A | 7/1962 |
| GB | 1266367 A | 3/1972 |
| WO | 2018184823 A1 | 10/2018 |

\* cited by examiner

ELECTRICALLY INSULATED ELECTRIC CONDUCTOR STRIP, IN PARTICULAR FOR ELECTRIC MOTORS AND TRANSFORMERS

CROSS-REFERENCE TO RELATED APPLICATIONS

This application is a 35 U.S.C. § 371 national phase of PCT International Application No. PCT/EP2019/076587, filed Oct. 1, 2019, which claims the benefit of priority under 35 U.S.C. § 119 to German Patent Application No. 20 2018 105 660.3, filed Oct. 2, 2018, the contents of which are incorporated herein by reference in their entirety.

FIELD OF THE INVENTION

The present invention relates to an electrically insulated electrical conductor strip, in particular for electric motors and transformers, including a strip-shaped electrical conductor that includes an upper cover surface and a lower cover surface, two side edge surfaces, and a face edge surface on each end side, and including an electrical insulation that is disposed on at least one cover surface of the strip.

BACKGROUND

Electrical conductor strips of this kind are used for the manufacturing of windings of electrical coils, i.e., of windings for dynamos, electric motors, transformers, relays, contactors, inductors, ignition coils, electricity meters, and controllable deflecting magnets. In particular, cast or rolled strips and metal plates are common here. Since eddy currents are produced under the influence of variable magnetic fields in a coil core made of solid material, whereby the coil can heat up, the windings are preferably designed as wound strips in order to avoid poorly heat-conducting air pockets.

To achieve an insulation between two conductor strip layers resting one-atop-the-other, today plastic layers, for example, are wound-in as insulation in metal-strip spools. For this purpose polyimide films are often used that are sold, for example, by the company Dupont under the name Nomex®.

In order to reduce the expense in the manufacture of a metal strip spool, an alternative to the placement of films between the strips would be to coat the strip on one or both sides with an electro-insulation lacquer as is realized in a known manner with conductors that have a round cross-section. For this purpose wire lacquers are known that are synthetic-resin based insulation lacquers that can be applied as very thin, homogeneous electrically insulating films onto copper or aluminum wires. A distinction is made here between various groups of wire lacquers, such as THEIC-modified polyesterim ides, polyamides, and epoxides, solderable wire lacquers made of polyurethane and adhesive lacquers, such as, for example, of PVB (polyvinyl butyral) and polyimide.

However, in the lacquer of an electrical conductor strip having a rectangular cross-section, which can be described geometrically as cuboidal and includes a face edge surface on each end side, the two side edge surfaces then regularly remain insufficiently or not at all coated. This is because due to the surface tensions a meniscus forms before the actual —for example, following a so-called burning-in polymerization of the wire lacquer, such that during hardening of the lacquer on the respective upper and lower edges of the side edge surfaces, where these are each adjacent to the cover surfaces, the lacquer layer then tapers to minimum or even forms defects. Here the electrical insulation effect is then insufficient. Current arcing between the layers may occur and/or at least leakage currents can result.

The object of the present invention is to provide an electrically insulated electrical conductor strip of the above-described type that is manufacturable with reduced expense, in particular by using a lacquer for the insulation, but which has a high electrical insulation effect.

SUMMARY

The above object is inventively achieved by the insulation comprising a lacquer layer as well as a film adhesive tape that is adhered to the lower cover surface and/or to the upper cover surface of the strip-shaped electrical conductor, and specifically at least in a respective region that abuts against a side edge surface, wherein the lacquer layer is positioned under the adhesive tape and at least directly on the lower cover surface and/or on the upper cover surface.

After the lacquer, the strip edge is therefore laminated with a temperature-stable adhesive tape (e.g., made of polyimide). Thus—in comparison to the prior art—a large surface of the expensive plastic layer can be replaced by a lacquer, without the electro-insulation effect being impaired on the strip edge.

Further advantageous embodiments of the invention are contained in the dependent claims and in the following detailed description.

BRIEF DESCRIPTION OF THE DRAWINGS

The invention is explained in more detail based on an exemplary embodiments illustrated by the accompanying drawings.

Here

In FIGS. 2 to 7, identical parts of the conductor strip are indicated by the same reference numbers as in FIG. 1.

DETAILED DESCRIPTION

In the following description it is expressly emphasized that the invention is not limited to the exemplary embodiments and also not to all or a plurality of features of described feature combinations. Rather, each individual partial feature of the exemplary embodiments can also have inventive significance in themselves and also in combination with other partial features, separately from all other partial features thus described in the context.

Figure 1:
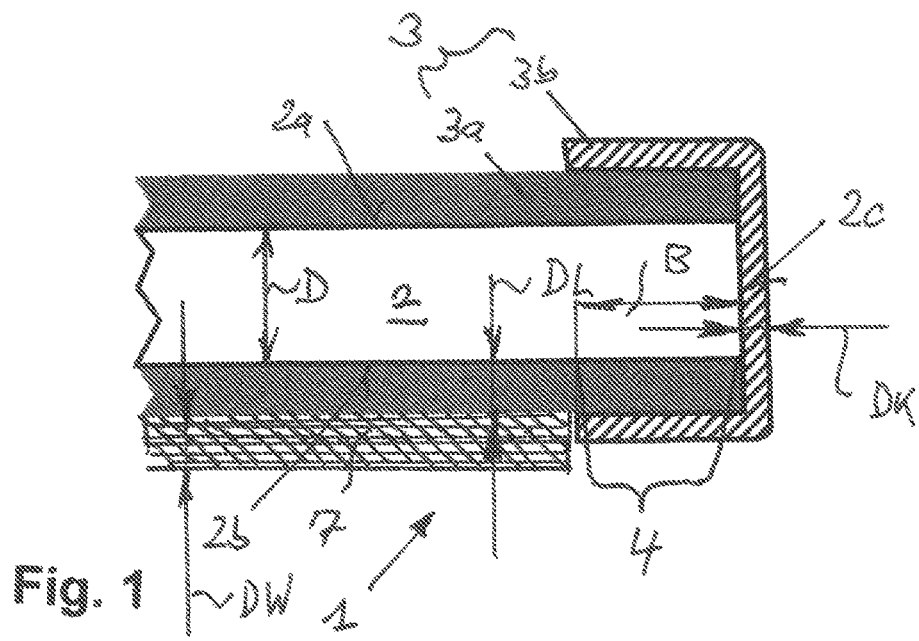
FIG. 1 shows an inventive conductor strip in schematic sectional view.

The inventive conductor strip 1 depicted in FIG. 1 comprises a strip-shaped electrical conductor 2, which has an upper cover surface 2a and a lower cover surface 2b, two side edge surfaces 2c—one of them is respectively shown to the right in the figures——and a (not-depicted) face edge surface on each end side (in the viewing plane).

The strip-shaped electrical conductor 2 can in particular be comprised of aluminum or of an aluminum alloy or of copper or of a copper alloy, and preferably can have a thickness D in the range of 0.1 mm to 1.5 mm.

Furthermore, the inventive conductor strip 1 comprises an electrical insulation 3 that is applied to at least one side of the strip 1—in the embodiment depicted according to FIG. 1, to both the lower cover surface 2b and to the upper cover surface 2a.

The insulation comprises a lacquer layer 3a as well as an adhesive tape 3b, in particular a film adhesive tape that is comprised of plastic and that (under intermediate position of the lacquer layer 3a) is adhered to the lower cover surface 2b and to the upper cover surface 2a of the strip-shaped electrical conductor 2, and specifically at least respectively in a region 4 that is directly adjacent to a side edge surface 2c.

The region 4, which is directly adjacent to the side edge surface 2c of the strip-shaped electrical conductor 2, can have a width B in the range of 0.3 cm to 5.0 cm, preferably in the range of 0.5 cm to 2.0 cm. Independently of the width B of the conductor strip, the desired electrical insulation effect is thus ensured in any case.

Here the lacquer layer 3a rests upon the top side below or on the underside above the adhesive tape 3b and at least directly on the upper cover surface 2a and/or on the lower cover surface 2b. In the embodiments depicted in FIGS. 1, 3, 4, and 6 the lacquer layer 3a rests upon both cover surfaces 2a, 2b. In the cases depicted in FIGS. 2 and 5 the lacquer layer 3a rests only upon the upper cover surface 2a.

The lacquer of the lacquer layer 3a, which can be applied by immersion, such as by an electro-immersion lacquer, by brushing-on, rolling on, centrifugation, spraying, in particular in a strip passage method, and then cured, causes at least the lower cover surface 2b and/or the upper cover surface 2a to be sufficiently electrically insulated.

Here the lacquer layer 3a can be formed from a lacquer that can also be referred to as a primary lacquer, based on organic polymers, such as made of an acrylic, epoxy, polyester, polyamide, or fluoropolymer lacquer, or based on sol-gel compositions, in particular made of a wire lacquer, such as a THEIC-modified polyesterimide. The lacquer layer 3a can preferably have a thickness DL in the range of 2 μm to 20 μm.

Figure 3:
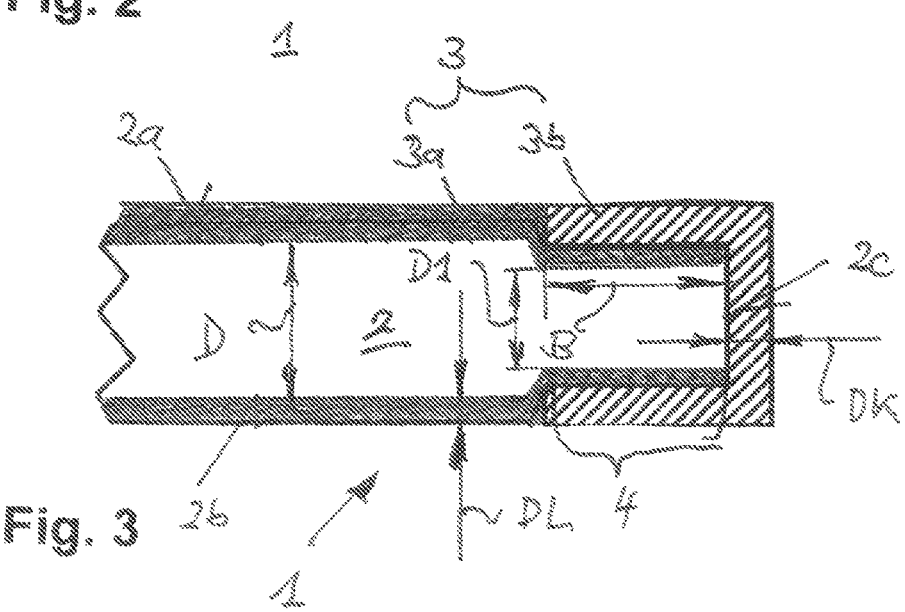

As depicted in FIG. 3, in the region of the adhesive tape 3b this thickness DL can also be smaller, in particular so that a flat surface of the insulation 3 arises. For this purpose the electrical conductor 2 has a reduced strip thickness D1 in the region 4 in front of its side edge surface 2c—in comparison to the strip thickness D in the rest of the strip region.

According to the embodiment depicted in FIG. 3, the adhesive tape 3b can preferably have a thickness DK in the range of 3 μm to 20 μm, wherein this thickness DK should preferably be at least half as large as the thickness DL of the lacquer layer 3a in the region where no adhesive tape 3b is located.

Figure 2:
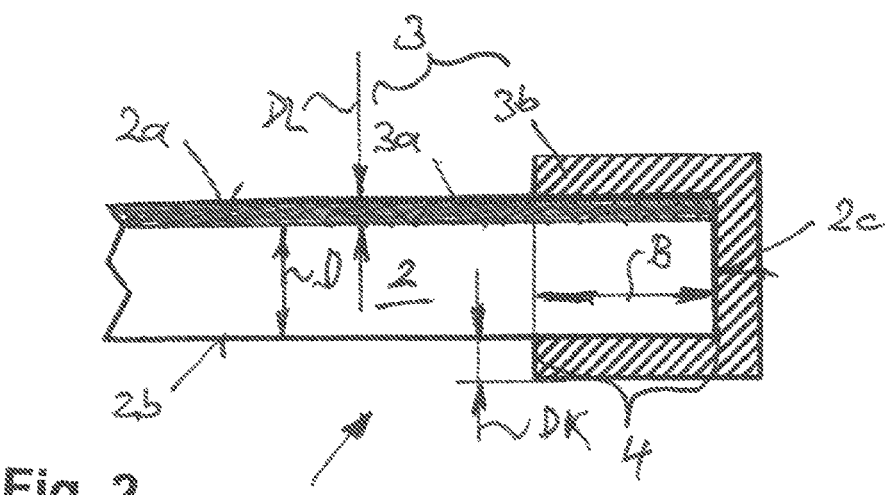
FIGS. 2 to 7 show variants of the inventive conductor strip.
Figure 4:
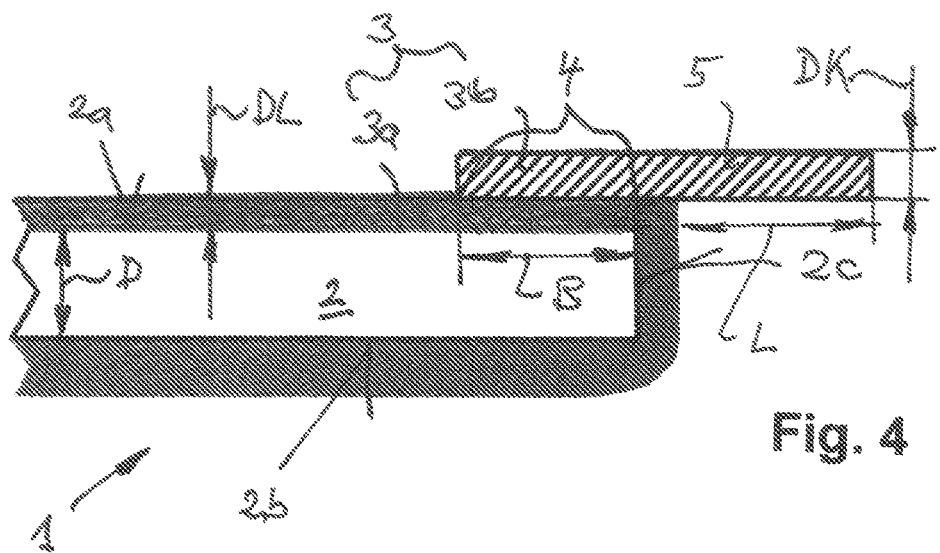
Figure 5:
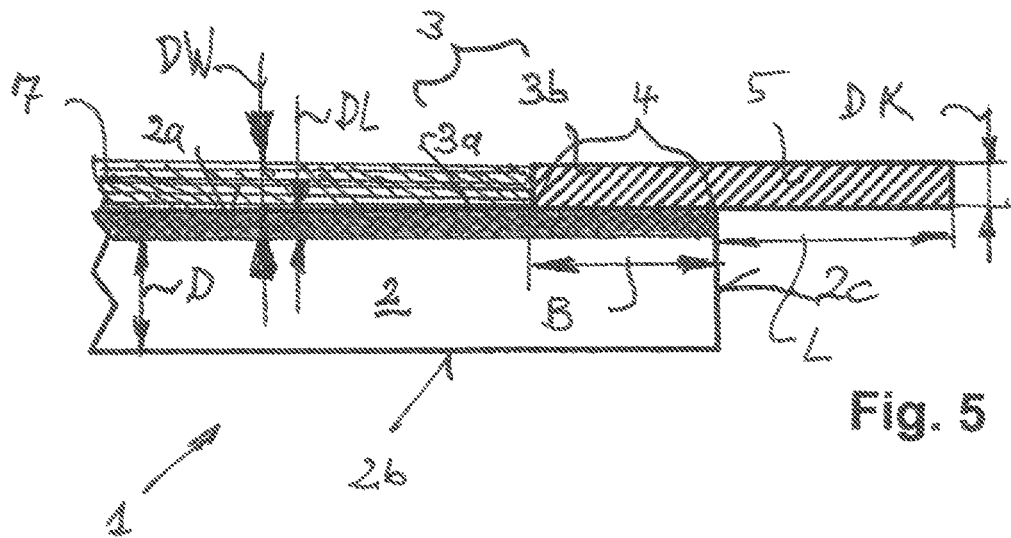
Figure 6:
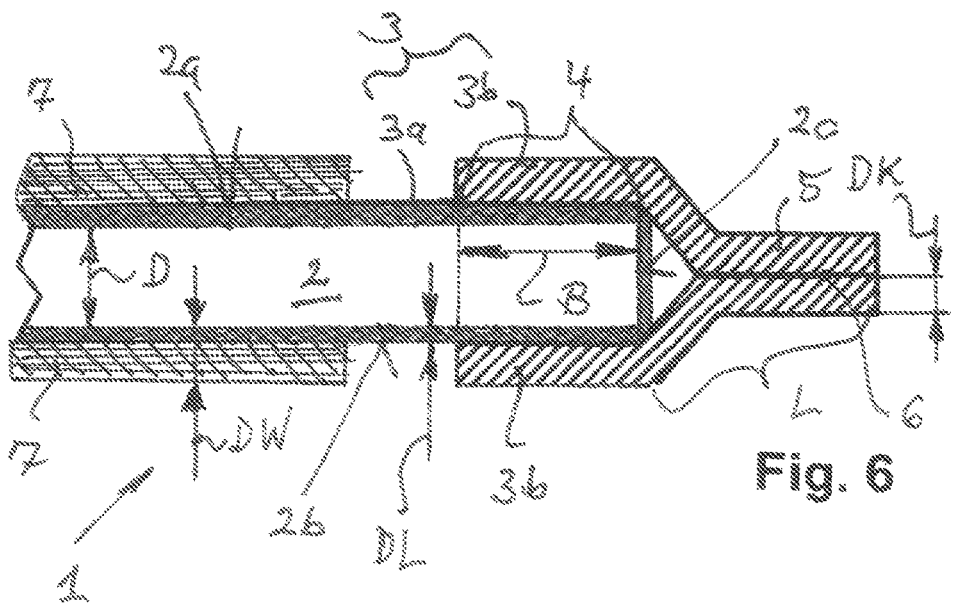

According to the embodiments in FIGS. 1 to 3, the adhesive tape 3b is C-shaped, starting from the cover surfaces 2a, 2b, adhered around a not-coated side edge surface 2c, while according to the embodiments in FIGS. 4 to 6 the adhesive tape 3b has an overhang 5 with respect to the side edge surface 2c of the strip-shaped electrical conductor 1, whereby leakage currents can be prevented. The protrusion 5 can preferably have a length L in the range 0 cm<L≤5 cm.

The adhesive tape 3b can be applied one-side (FIGS. 4 and 5) or on both sides (FIG. 6), wherein an adhesion 6 can also occur in the region of the overhang 5.

The person skilled in the art can also supplement further technical features without leaving the scope of the invention. For example, in the assembled state of the electrical conductor strip 1 the face edge surfaces can also be inventively equipped.

Furthermore, the exemplary embodiments in FIGS. 4 and 6, for example, show that the side edge surfaces 2c of the strip-shaped electrical conductor 2 can also be coated.

The inventive conductor strip 1 can come for delivery spirally wound onto itself. In order to prevent that an undesired edge waviness forms on both sides due to the presence of the adhesive tape 3b, a strip-shaped winding aid 7—optionally provided with an adhesive layer—in particular in the form of a plastic film, can be provided as depicted in FIGS. 1 and 5 on one side of the conductor 2 and in FIG. 6 on both sides of the conductor 2. This winding aid 7 advantageously acting as a spacer between the winding layers is placed at least on one of the cover surfaces 2a, 2b between the adhesive tape regions 4. Here the winding aid 7 can advantageously be comprised of a plastic material, such as polyethylene (PE) or polyethylene terephthalate (PET), on which—in particular with respect to its insulation capability—lower technical requirements are placed than on the film of the adhesive tape 3b, and which is therefore more economical than the adhesive tape film. The thickness DW of the winding aid 7 should be, in particular—depending on the type of application—at least as great as the adhesive tape thickness DK (in particular for the embodiments according to FIGS. 4 and 5) or preferably at least as great as twice the adhesive tape thickness DK (in particular for the embodiments according to FIGS. 1, 2, and 6). The thickness DW of the winding aid 7 can in particular fall in the range from 3 μm to 50 μm, preferably from 30 μm to 40 μm. The winding aid 7 can also be slightly thinner than the adhesive tape thickness DK, but only by so much that during winding the elongation of the metallic conductor 2 does not leave the elastic range.

Figure 7:
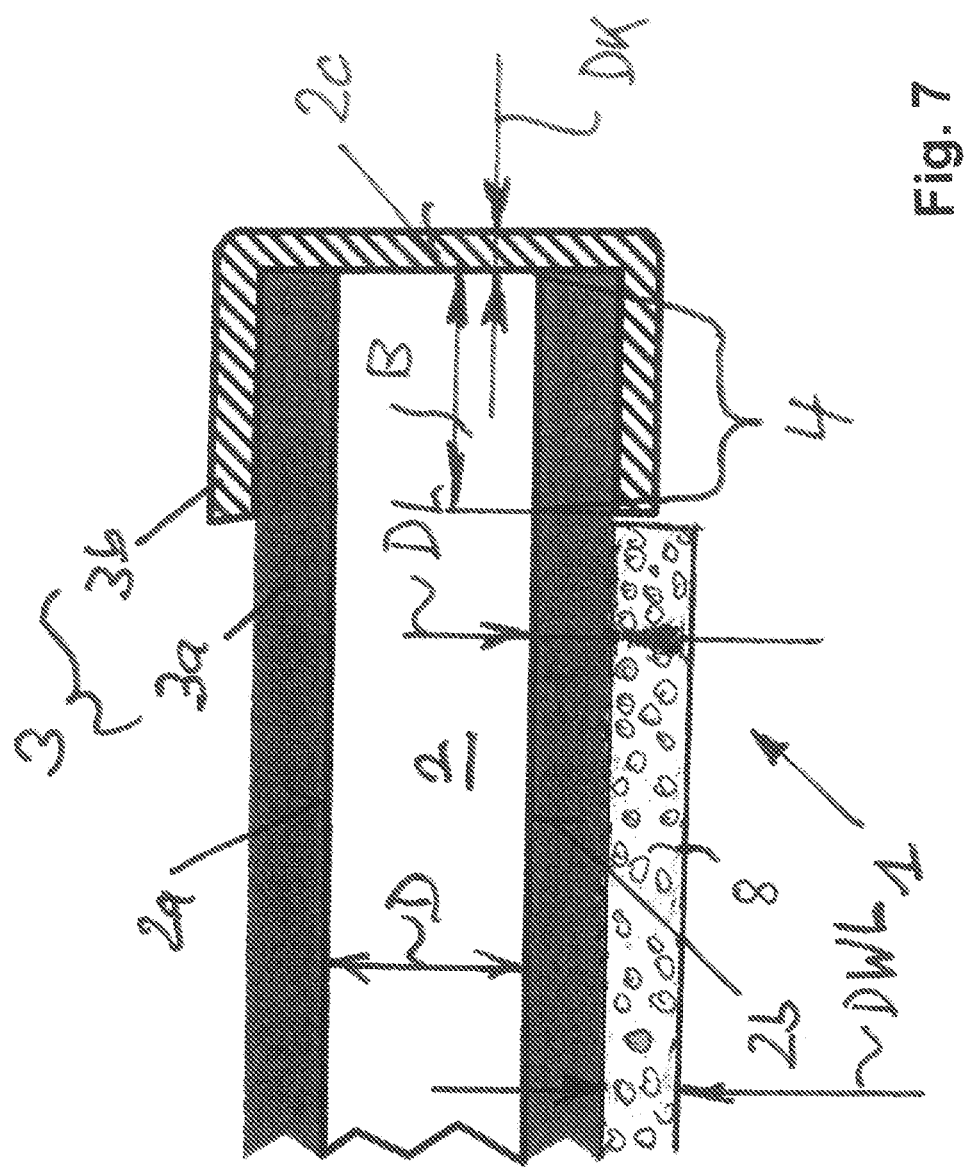

According to the embodiment in FIG. 7 a secondary lacquer layer 8 is provided instead of the winding aid 7. The secondary lacquer layer 8 is located—similar to the winding aid 7—on the lacquer layer 3a between the regions 4 with the adhesive tape 3b and is comprised of a secondary lacquer, such as made of a baked lacquer.

The further lacquer layer 8 can preferably be manufactured from an epoxy resin or from a one-component polyurethane system including blocked isocyanates as a secondary lacquer. In the one-component polyurethane system, in particular in a final processing step, at a prescribed temperature, e.g., at 150° C., the isocyanates are unblocked, and due to polyaddition lead to a crosslinked polyurethane.

The further lacquer layer 8 can have a thickness DWL, whose absolute values can fall in particular in the range from 3 μm to 50 μm, preferably 6 μm to 40 μm.

If the conductor strip 1 is spirally wound onto itself for transport, the further lacquer layer 8 comprised of a secondary lacquer can assume the function of the winding aid 7 or serve to reduce the thickness DW of the winding aid 7 to be provided via the further lacquer layer 8. It thus serves, just as the winding aid 7, as a spacer between the winding layers, and the same restrictions apply for the thickness DWL of the further lacquer layer 8 or the sum of the thickness DWL and the thickness DW, as has been discussed above for the thickness DW (alone). The further lacquer layer 8 comprised of the secondary lacquer thus performs completely or partially the same function as the winding aid 7 of preventing a two-side edge waviness. It thus serves as a spacer between the winding layers.

On the other hand, the further lacquer layer 8—in contrast to the winding layer—advantageously need not be removed again in the manufacturing of an electrical device having an electrical coil—such as a dynamo, an electric motor, a transformer, a relay, a contactor, an inductor, an ignition coil, an electricity meter, or a controllable deflection magnet. Rather, the assembly layers lying one-atop-the-other, which are each formed from the conductor strip 1, can be connected in a material-bonded manner by the further lacquer 8 formed from the secondary lacquer, by the secondary lacquer being cured, in particular by a thermal treatment after the assembly layer formation. A recycling of the winding layer is thereby omitted.

Furthermore, the secondary lacquer increases the insulation effect of the primary lacquer so that optionally the thickness DL of the lacquer layer 3a directly on the lower cover surface 2b and/or on the upper cover surface 2a of the strip-shaped electrical conductor 2 can be selected smaller than is the case of the use of a winding aid 7. The further lacquer layer 8 thus advantageously fulfills a three-fold function. It functions first as a spacer during transport, second it increases the stability of a coil formed from the inventive conductor strip 1, and third increases the degree of insulation.

It can also be provided that the further lacquer layer 8 is configured as discontinuous, wherein the secondary lacquer is applied in particular in the form of a pattern, such as made of strips, circles, or rhombuses. On the one hand this promotes a material savings, on the other hand in an electrical device having an electric coil, wherein a plurality of assembly layers each formed from the inventive conductor strip 1 rest one-atop-the-other, intermediate spaces in the further lacquer layer 8 that arise from a discontinuity of the secondary lacquer can be filled with oil.

Furthermore, the invention is not limited to the combinations of features defined in claims 1 and 20, but rather can also be defined by any other combination of specific features of all of the individual features disclosed overall. This means that in principle practically any individual feature of the independent claim can be removed or replaced by at least one individual feature disclosed elsewhere in the application. In this respect the claims should only be considered as a first attempt at formulating an invention.

While the above description constitutes the preferred embodiment of the present invention, it will be appreciated that the invention is susceptible to modification, variation and change without departing from the proper scope and fair meaning of the accompanying claims.

The invention claimed is:

1. An electrically insulated electrical conductor strip, in particular for electric motors and transformers, comprising a strip-shaped electrical conductor that includes an upper cover surface and a lower cover surface, two side edge surfaces and a face edge surface on an end side, and including an electrical insulation that is disposed on at least one cover surface of the strip,
   the insulation comprises a first lacquer layer as well as an adhesive tape that is adhered to the lower cover surface or the upper cover surface of the strip-shaped electrical conductor at least in a region that is adjacent to one of the side edge surfaces, wherein the first lacquer layer lies under the adhesive tape and at least directly on the lower cover surface or on the upper cover surface, and
   a strip-shaped winding aid or a further lacquer layer is disposed on the first lacquer layer between the regions including the adhesive tape and not overlapping the adhesive tape.

2. The conductor strip according to claim 1, further comprising the adhesive tape is respectively adhered C-shaped, starting from the cover surfaces around one of the side edge surfaces.

3. The conductor strip according to claim 1, further comprising that the adhesive tape has an overlap with respect to one of the side edge surfaces of the strip-shaped electrical conductor, which overlap and has a length in the range 0 cm<L≤5 cm.

4. The conductor strip according to claim 1, further comprising the strip-shaped electrical conductor is comprised of aluminum or of an aluminum alloy or of copper or of a copper alloy, and has a thickness D in the range of 0.1 mm to 1.5 mm.

5. The conductor strip according to claim 1, further comprising that the first lacquer layer has a thickness in the range of 2 μm to 25 μm.

6. The conductor strip according to claim 1, further comprising that the adhesive tape has a thickness in the range of 3 μm to 20 μm, wherein the adhesive tape thickness is at least half as great as a thickness of the first lacquer layer in a region where the adhesive tape is not located.

7. The conductor strip according to claim 1, further comprising the first lacquer layer is formed of a lacquer based on organic polymers, or of an acrylic, an epoxy, a polyester, a polyamide, or a fluoropolymer lacquer, or based on a sol-gel composition or made of a wire lacquer, or a THEIC-modified polyesterimide.

8. The conductor strip according to claim 1, further comprising the region of the adhesive tape that is directly adjacent to one of the side edge surfaces of the strip-shaped electrical conductor, has a width in the range of 0.3 cm to 5.0 cm, or in the range of 0.5 cm to 2.0 cm.

9. The conductor strip according to claim 1, further comprising that the strip-shaped winding aid is comprised of a plastic film, a polyethylene or a polyethylene terephthalate.

10. The conductor strip according to claim 1, further comprising the strip-shaped winding aid has a thickness that is at least as great as a thickness of the adhesive tape when the adhesive tape is only adhered one-side to the carrier.

11. The conductor strip according to claim 1, further comprising the strip-shaped winding aid has a thickness that is at least twice as great as a thickness of the adhesive tape thickness when the adhesive tape is adhered to the carrier on both sides.

12. The conductor strip according to claim 1, further comprising the strip-shaped winding aid has a thickness in the range of 3 μm to 50 μm, or of 30 μm to 40 μm.

13. A conductor strip according to claim 1, further comprising the further lacquer is comprised of a baked lacquer.

14. A conductor strip according to claim 1, further comprising the further lacquer layer is manufactured from an epoxy resin or from a one-component polyurethane system including blocked isocyanates, wherein, in a final processing step, at a prescribed temperature the isocyanates are unblocked and due to polyaddition lead to a crosslinked polyurethane.

15. The conductor strip according to claim 1, further comprising the further lacquer layer has a thickness that is at least as great as the thickness of the adhesive tape when the adhesive tape is adhered only one-side to the carrier.

16. The conductor strip according to claim 1, further comprising the further lacquer layer has a thickness that is at least twice as great as the thickness of the adhesive tape when the adhesive tape is adhered to the carrier on both sides.

17. The conductor strip according to claim 1, further comprising the further lacquer layer has a thickness in the range from 3 μm to 50 =m, or from 6 μm to 40 μm.

18. The conductor strip according to claim 1, further comprising the further lacquer layer is configured as discontinuous, wherein the secondary lacquer is applied in particular in the form of a pattern, including made of strips, circles, or rhombuses.

19. The conductor strip according to claim 1, further comprising the conductor strip is spirally wound onto itself forming winding layers, the winding aid or the further lacquer layer is disposed between the winding layers, for preventing a two-side edge waviness.

20. An electrical device, such as a dynamo, an electric motor, a transformer, a relay, a contactor, an inductor, an ignition coil, an electricity meter, or a controllable deflection magnet, having an electrical coil, wherein a plurality of assembly layers, each formed from the conductor strip according to claim 1 or according to rest one-atop-the-other.

21. The electric device according to claim 20, further comprising the assembly layers are connected in a material-bonded manner by the further lacquer layer, formed from a baked lacquer is located on the first lacquer layer between the regions with the adhesive tape.

22. The electric device according to claim 20, further comprising the further lacquer layer is configured as discontinuous, wherein oil is located in the intermediate spaces formed by the discontinuity of the secondary lacquer.

\* \* \* \* \*

UNITED STATES PATENT AND TRADEMARK OFFICE
CERTIFICATE OF CORRECTION

PATENT NO. : 12,027,284 B2
APPLICATION NO. : 17/219286
DATED : July 2, 2024
INVENTOR(S) : Stefan Ziegler and Volker Wandelt It is certified that error appears in the above-identified patent and that said Letters Patent is hereby corrected as shown below:

In the Specification

Column 1, Line 53, under "BACKGROUND", delete "polyimide" and substitute therefor --polyamide--.

Column 2, Line 23, under "SUMMARY, delete "polyimide" and substitute therefor --polyamide--.

In the Claims

Column 2, Claim 17, Line 3, delete "50 =m" and substitute therefor --50 µm--.

Signed and Sealed this
Seventeenth Day of September, 2024

*Katherine Kelly Vidal*

Katherine Kelly Vidal
*Director of the United States Patent and Trademark Office*